United States Patent
Iacono et al.

(10) Patent No.: US 8,024,001 B2
(45) Date of Patent: *Sep. 20, 2011

(54) METHOD, SYSTEM AND COMPONENTS FOR FACILITATING WIRELESS COMMUNICATION IN A SECTORED SERVICE AREA

(75) Inventors: Ana Lucia Iacono, Garden City, NY (US); Arty Chandra, Manhasset Hills, NY (US); Zheng Zhao, Plainsboro, NJ (US)

(73) Assignee: InterDigital Technology Corporation, Wilmington, DE (US)

(*) Notice: Subject to any disclaimer, the term of this patent is extended or adjusted under 35 U.S.C. 154(b) by 550 days.

This patent is subject to a terminal disclaimer.

(21) Appl. No.: 11/787,392

(22) Filed: Apr. 16, 2007

(65) Prior Publication Data

US 2007/0191063 A1 Aug. 16, 2007

Related U.S. Application Data

(63) Continuation of application No. 11/023,861, filed on Dec. 28, 2004, now Pat. No. 7,206,610.

(60) Provisional application No. 60/622,900, filed on Oct. 28, 2004.

(51) Int. Cl.
*H04M 1/00* (2006.01)
*H04W 40/00* (2009.01)
*H04W 4/00* (2009.01)

(52) U.S. Cl. ............... 455/562.1; 455/446; 455/434; 370/328

(58) Field of Classification Search ............ 455/562.1, 455/561, 446, 434; 370/328
See application file for complete search history.

(56) References Cited

U.S. PATENT DOCUMENTS

| | | |
|---|---|---|
| 2003/0033394 A1 | 2/2003 | Stine |
| 2003/0036404 A1 | 2/2003 | Adachi et al. |
| 2003/0064752 A1* | 4/2003 | Adachi et al. ............ 455/560 |
| 2003/0203740 A1 | 10/2003 | Bahl et al. |
| 2004/0023678 A1 | 2/2004 | Fredriksson |
| 2004/0072570 A1 | 4/2004 | Smith |
| 2004/0171407 A1 | 9/2004 | Ninomiya |
| 2004/0242273 A1 | 12/2004 | Corbett et al. |
| 2005/0003865 A1 | 1/2005 | Lastinger et al. |
| 2005/0058151 A1 | 3/2005 | Yeh |
| 2005/0208958 A1 | 9/2005 | Bahl et al. |
| 2005/0282553 A1 | 12/2005 | Lastinger et al. |
| 2006/0040709 A1 | 2/2006 | Adachi et al. |

OTHER PUBLICATIONS

Hole, "Indoor WLAN Design," Part III: Understanding the 802.11 MAC, (May 3, 2003).

LAN MAN Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", ANSI/IEEE Std 802.11, 1999 Edition (R2003), (Jun. 12, 2003).

* cited by examiner

*Primary Examiner* — Christopher M Brandt
(74) *Attorney, Agent, or Firm* — Volpe and Koenig, P.C.

(57) ABSTRACT

Network Allocation Vector (NAV) and "beam access control" (BAC) techniques are provided to address data collision problems in WLANs wherein APs provide wireless network access in a service area defined by multiple sectors via use of a switchable antenna system or the like. Preferably, every time the AP visits a sector and before the AP moves on to the next sector, the AP can set the NAV equal to the time it will take until its next visit. Alternatively, or in addition, a BAC bit is transmitted by an AP to control access to the AP by WTRUs disposed in a service sector in which the BAC is transmitted.

7 Claims, 2 Drawing Sheets

METHOD, SYSTEM AND COMPONENTS FOR FACILITATING WIRELESS COMMUNICATION IN A SECTORED SERVICE AREA

CROSS REFERENCE TO RELATED APPLICATIONS

This application is a continuation of U.S. patent application Ser. No. 11/023,861, filed Dec. 28, 2004, which claims the benefit of U.S. Provisional Patent Application No. 60/622,900, filed Oct. 28, 2004, which is incorporated by reference as if fully set forth.

FIELD OF INVENTION

The present invention relates to a wireless communication system. More particularly, the present invention relates to wireless local area networks (WLANs), such as IEEE 802.11 networks, and to a communication method and components, such as access points (APs) that use beam forming, which provide communication services to a region for wireless transmit/receive units (WTRUs).

BACKGROUND

Wireless communication systems are well known in the art. Generally, such systems comprise communication stations, which transmit and receive wireless communication signals between each other. Depending upon the type of system, communication stations typically are one of two types of wireless transmit/receive units (WTRUs): one type is the base station, the other is the subscriber unit, which may be mobile.

The term base station as used herein includes, but is not limited to, a base station, access point, Node B, site controller, or other interfacing device or WTRU in a wireless environment, that provides other WTRUs with wireless access to a network with which the AP is associated.

The term wireless transmit/receive units (WTRU) as used herein includes, but is not limited to, a user equipment, mobile station, fixed or mobile subscriber unit, pager, or any other type of device capable of operating in a wireless environment. Such WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided wherein each base station is capable of conducting concurrent wireless communications with appropriately configured WTRUs, as well as multiple appropriately configured base stations. Some WTRUs may alternatively be configured to conduct wireless communications directly between each other, i.e., without being relayed through a network via a base station. This is commonly called peer-to-peer wireless communications. Where a WTRU is configured to communicate directly with other WTRUs it may itself also be configured as and function as a base station. WTRUs can be configured for use in multiple networks, with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

Popular WLAN environments with one or more WLAN base stations, typically called access points (APs), include those constructed according to one or more of the IEEE 802 family of standards. Access to these networks usually requires user authentication procedures. Protocols for such systems are presently being standardized in the WLAN technology area. One such framework of protocols is represented by the IEEE 802 family of standards.

A basic service set (BSS) is the basic building block of an IEEE 802.11 WLAN, which comprises WTRUs also referred to as stations (STAs). A set of STAs which can talk to each other can form a BSS. Multiple BSSs are interconnected through an architectural component called a distribution system (DS), to form an extended service set (ESS). An access point (AP) is a WTRU that provides access to the DS by providing DS services, and generally allows concurrent access to the DS by multiple STAs.

A network of WTRUs operating with peer to peer communications in an IEEE 802.11 environment, typically referred to as "ad hoc" mode, is also called an "independent BSS." In an independent BSS, two or more WTRUs establish communication among themselves without the need of a coordinating network element. No AP-to-network infrastructure is required. However, an AP can be configured to use the ad hoc protocols and act as the WTRUs do in peer to peer communications. In such case an AP may act as a bridge or router to another network or to the Internet.

A WTRU that starts an ad hoc network selects the ad hoc network's operating parameters, such as the service set identifier (SSID), channel, and beacon timing, and transmits this information in communication frames, for example, in beacon frames. As other WTRUs join the ad hoc network, they detect and use the ad hoc network's operating parameters.

Where a network infrastructure is used and wireless communications are controlled through APs, parameters such as the SSID are normally specified by a network controller associated with the APs. The APs periodically broadcast beacon frames to enable WTRUs to identify the APs and attempt to establish communications with them. For example in FIG. 1, a WLAN is illustrated in which WTRUs conduct wireless communications via a network station, in this case an AP. The AP is connected with other network infrastructure such as a Network Management Station (NMS). The AP is shown as conducting communications with five WTRUs. The communications are coordinated and synchronized through the AP. Generally, the WLAN system supports WTRUs with different data rates. In some cases an AP is configured to support multiple types of WTRUs, such as 802.11(b) and 802.11(g) compliant WTRUs.

The SSID in an IEEE 802 based system can be a 32-character unique identifier attached to a header of packets sent over a WLAN. The SSID then acts as a password when a WTRU attempts to connect to a BSS or an independent BSS. The SSID differentiates one WLAN from another, so all base stations and all other devices connected to or attempting to connect to a specific WLAN normally use the same SSID. A device will not normally be permitted to join a BSS unless it can provide the correct SSID.

A WLAN system made in accordance with the IEEE 802.11 standard, typically uses a carrier sensing mechanism, where WTRUs sense a wireless medium, such, as a particular communication channel, before transmitting data packets to an AP, and only transmit the data packets when the medium is free. If the medium is busy, a WTRU defers its transmission. This works reasonably well when WTRUs are able to receive transmissions of other WTRUs communicating in the WLAN. However, some WTRUs may be hidden from others, and, accordingly, cannot always detect when the medium is busy.

For example, both a first WTRU and a second WTRU may be positioned where they are each able to communicate with an AP, but, due to their locations, they are not able to communicate with each other. An obstruction between the two WTRUs, such as a building or a mountain, can cause this situation. When the first WTRU transmits to the AP, the second WTRU is not able to sense that the medium is busy due to the obstruction or other cause of lack of communication between the two WTRUs. If the second WTRU begins to transmit at the same time as the first WTRU is, the packets will collide at the AP (i.e., the AP is not able to decode the packets received from both WTRUs at the same time).

In order to reduce the severity or avoid this problem, a Network Allocation Vector (NAV) is conventionally used when transmitting on the medium. The NAV provides a timing function that blocks all WTRUs that receive it from transmitting during a period of time set by the NAV. The WTRUs that receive the NAV assume that the medium is busy during the period of time equal to the NAV time period. After the NAV period, the WTRUs that had previously received the NAV are free to normally contend for the medium. Where request to send (RTS) and clear to send (CTS) signaling is used between a WTRU and an AP to grant WTRU requests to transmit data packets, an NAV will be included with the RTS advising all WTRUs in the range of the WTRU transmitting the RTS not to transmit on the medium. In turn, a CTS response from the AP will include a NAV that expires contemporaneously with the NAV in the RTS, thereby alerting all WTRUs receiving the CTS to defer transmissions until the expiration of the NAV. The WTRU that sent the RTS and receives a responsive CTS transmits during the NAV period since the CTS overrides the NAV in the CTS for that WTRU. A responsive CTS normally will not be sent in response to a WTRU's RTS where that RTS is transmitted during the NAV of a prior RTS received by the AP.

Various types of antenna systems can be employed by WTRUs. A switched beam antenna system is a system where multiple fixed beams are defined and the beam that provides the greatest signal enhancements and interference reduction is usually selected for conducting a communication. By using a directional antenna instead of an omni-directional antenna, a higher signal-to-noise ratio (SNR) may be obtained, allowing the link to operate at higher data rates. For base stations, such as APs, the directional beam can also extend the geographic service area of coverage in the direction of the beam. Thus, a switched beam antenna system may improve the coverage area and transmission speed due to the gains provided by directional beams instead of an omni-directional beam for wireless communications. Using a switched beam antenna system, an AP can select the best beam to be used to transmit and receive, depending on the location of a WTRU which is accessing the AP's network via the AP. The selection can be based on any metric that reflects an improvement in transmission and/or reception of the wireless signals.

Collision problems, such as discussed above, exist irrespective of whether a omni-directional or a switched beam antenna system is employed by an AP. For example, consider the case where a first WTRU and a second WTRU are located at opposite sides of an AP that employs a switched beam antenna system. To send data packets to the first WTRU, the AP activates a beam pointed toward the first WTRU and starts data packet transmission. At this time, the second WTRU is likely not able to detect the AP transmission because the beam is pointing toward the first WTRU. Because the second WTRU is unlikely to sense any data traffic, the second WTRU could start transmitting at the same time that the AP is transmitting. If the first and second WTRUs are not hidden from each other, the first WTRU can receive both the second WTRU's transmissions and the AP's transmission creating a potential collision such that the first WTRU would not receive the AP's transmitted data packets successfully.

In order to avoid this problem, before starting to send the data packets to the first WTRU, the AP can notify all other WTRUs in the AP's service area that the medium will be busy. As explained above, this is typically done using a NAV. For the AP to reach all WTRUs, the AP can use an omni-directional signal to transmit the NAV information. However, if the AP uses an omni-directional signal to communicate with all WTRUs before every transmission, then the coverage area of the switched beam antenna is effectively limited to the area that can be reached by the omni directional antenna. Thus, this solution does not extend the coverage area to the full range of a switched directional antenna system.

"Beam sweeping" has been proposed for switched antenna systems such that the antenna beam changes position with time, serving each respective sector for a period of time. Sectors are visited sequentially, or following some suitable pattern based on the system conditions (system load, users' positions, etc.). Different methods have been proposed for the WTRUs to know when to transmit. For example, synchronization between the WTRU and the AP beam sweeping using GPS geolocation or the like.

A characteristic of WLAN systems is that they use beacon signals, which contain synchronization information necessary for a WTRU to associate with a basic service set (BSS). Beacons are transmitted periodically by the AP to its entire service area, once every beacon period (BP). In a sectored service area, the beacons must periodically be transmitted to every sector within a predetermined time period.

To conserve power, WTRUs may go into a power save mode in between beacons, and only wake up to receive the beacons. If a sector is visited before its beacon period expires, the WTRUs in that sector may be in a power save mode, and any transmissions from the AP will not be received. This situation can be avoided if the beam sweeping pattern is sequential and the beam is redirected at regular intervals. However, regular sequential beam sweeping does not allow for flexible scheduling of the beams and, if the sectors are not equally loaded, performance can deteriorate in the more heavily loaded sectors. A variety of irregular sequences are not feasible when a beacon must be transmitted to every sector at the expiration of every beacon period. For example, in a case where there are seven sectors, 1-7, a sequence such as 1,2,3,4,2,5,6,2,7,1 would not be feasible if the beacon period expired in the time service started for sector 1 and ended for sector 6, since sector 7 would not have had a beacon signal sent within the beacon period.

It is desirable to provide collision avoidance techniques and equipment to implement such techniques for beam sweeping systems that facilitate a high degree of service flexibility for such systems. The inventors have recognized that NAV can be used in a beam sweeping system in order to reduce or eliminate the interference that WTRUs from one sector can cause to WTRUs in another sector.

The inventors have also recognized that there are undesirable consequences associated with a strict NAV collision avoidance approach in a beam sweeping system. Neighboring beams usually have an area of overlap. WTRUs that are located in an overlapping area could potentially be served by 2 beams, improving their throughput. However, once a WTRU receives an NAV in one beam, the WTRU defers transmissions for (N−1)*BP/N, and does not transmit in the neighboring beam. Moreover, when a WTRU first turns on and joins a WLAN, the WTRU may join via the beam that appears first, which might not be the best beam. Also, the signal strength near the boundary of the beam pattern will be attenuated, and WTRUs near the beam boundary will experience reduced data rates. Serving WTRUs by more than one beam is desirable to compensate for the lower data rates.

SUMMARY

A Network Allocation Vector (NAV) approach and a "beam access control" (BAC) technique are provided to address data collision problems in WLANs wherein APs provide wireless network access in a service area defined by multiple sectors via use of a switchable antenna system or the like. Preferably, every time the AP visits a sector and before the AP moves on to the next sector, the AP can set the NAV equal to the time it will take until its next visit. Alternatively, or in addition, a BAC bit is preferably transmitted by an AP to control access to the AP by WTRUs disposed in a service sector in which the BAC is transmitted.

Preferably, when the BAC bit indicates "on", WTRUs receiving the bit are allowed to transmit and/or contend to transmit on the wireless medium serving the sector. When the bit is "off", WTRUs receiving the bit are prohibited from transmitting on the wireless medium until an "on" bit is thereafter received. This mechanism permits APs to dynamically increase or decrease the time spent in each sector according to the communication load of the sectors, while reducing or eliminating packet collisions caused by transmissions from WTRUs which are not in an active sector.

In one aspect of the invention, a selectively configured AP is provided for a wireless local area network (WLAN). The AP is configured to provide communication services in a geographic area of service to wireless transmit/receive units (WTRUs). A preferred AP includes a transceiver configured to selectively generate directional beams for providing communication service in sectors of the geographic area of service such that each beam provides service to a predefined sector whereby collectively the directional beams provide service to the entire geographic service area. A control unit is operatively associated with the transceiver and is preferably configured to control the generation of the directional beams by the transceiver to switch from beam to beam such that service is provided only during selected periods in each sector. The preferred configuration of the control unit is such that a beam access control (BAC) signal is transmitted to WTRUs located in a sector indicating the cessation of a service period for that sector before switching to another beam to provide service in the sector associated with the other beam. Alternatively, or in addition, the control unit is configured such that NAV is transmitted to WTRUs located in a sector reflecting the time until service will resume in the sector.

For implementing a WLAN employing such an AP, wireless transmit/receive units (WTRUs) are provided that have a transceiver configured to receive signals transmitted by such an AP when providing service in a sector in which the WTRU is then located. Preferably the WTRUs are configured to suspend transmission of signals to the AP in response to receiving a BAC signal that indicates the cessation of a service period for that sector until receiving a further BAC signal from the AP. Alternatively, or in addition, the WTRUs are configured to suspend transmission of signals to the AP until the expiration of a controlling NAV.

In another aspect of the invention the AP has a control unit preferably configured to switch from beam to beam such that service is provided only during selected service periods (SPs) in each sector during a predefined beacon period (BP). A beacon service period ($SP_{beacon}$) is preferably provided for every sector in which to transmit a beacon signal at least once during each BP. A beam access control (BAC) signal is preferably transmitted within each $SP_{beacon}$ to control transmissions by WTRUs receiving the BAC signal during the BP.

Other objects and advantages will be apparent to those of ordinary skill in the art based upon the following description of presently preferred embodiments of the invention.

BRIEF DESCRIPTION OF THE DRAWING(S)

DETAILED DESCRIPTION OF THE PREFERRED EMBODIMENT(S)

The invention is particularly useful when used in conjunction with wireless local area networks (WLANs), such as those made in accordance with the IEEE 802 family of standards where WTRUs sense a wireless medium, such as a particular communication channel, before transmitting data packets and only transmit the data packets when the medium is free. It is particularly useful where such WLANs include base stations, such as access points (APs), that have switched beam antenna systems that provide antenna beam coverage for a plurality of sectors. However, benefits of the invention can be realized in any type of wireless network where similar problems are encountered.

Figure 1:
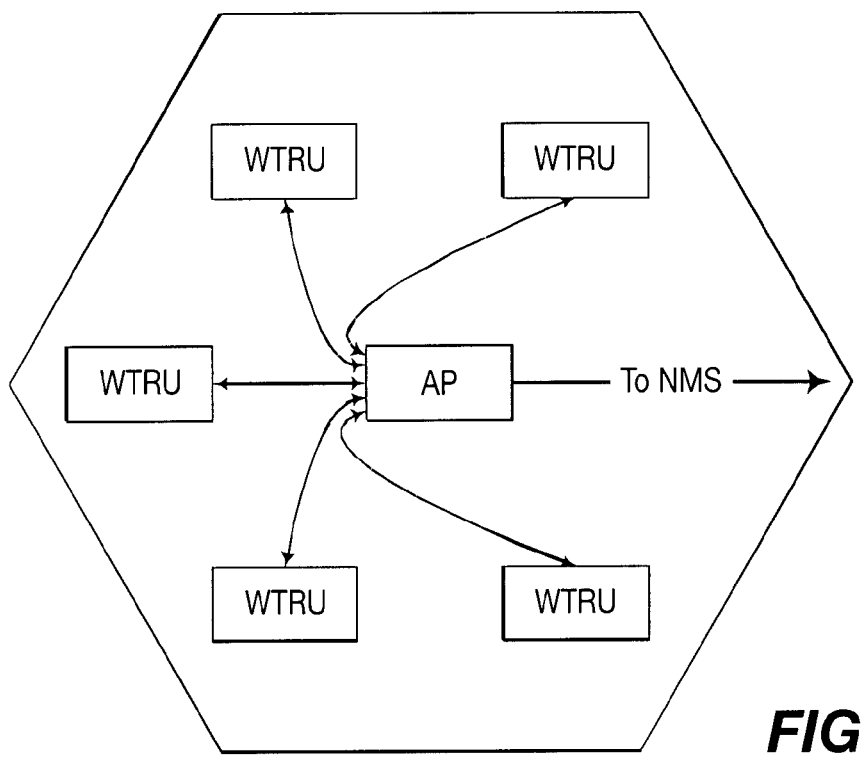
FIG. 1 is a system overview diagram illustrating conventional wireless communication in a wireless local area network (WLAN).
Figure 2:
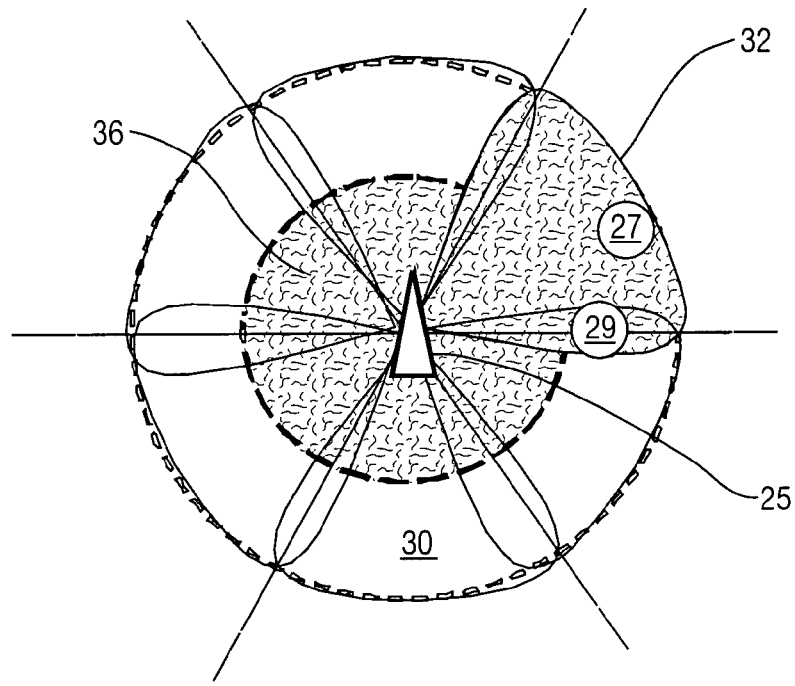
FIG. 2 is an operational diagram of a WLAN access point (AP) having a switched beam antenna system that provides antenna beam coverage for a plurality of sectors in accordance with the present invention.

By way of example, FIG. 2 illustrates an AP 25 of a WLAN that has a switched beam antenna system. Wireless service provided by the AP 25 through use of the switched beam antenna system is selectively provided to WTRUs, such as WTRUs 27, 29, when located in a service area 30 by selectively serving each of a plurality of sectors 32. The sectors 32 collectively define the service coverage area 30 for the AP 25. The AP's antenna system uses one or more directional antennas, such as a phase array antenna, to produce signal beams such that each beam covers one sector. Adjacent sectors preferably have some overlapping area to avoid coverage gaps within the overall service area 30. Through the use of the directional beams, the effective coverage area 30 extends substantially beyond the service area 36 that would typically be provided by AP 25 if AP 25 only utilized an omni-directional antenna.

The AP of FIG. 2 shows the wireless service area 30 divided into six sectors. However, a six sector area is provided by way of example and is not a limitation. Where a relatively large number of sectors define the overall coverage area 30, relatively narrow beams would typically be implemented.

A Network Allocation Vector (NAV) approach can be selectively used in a beam sweeping system in order to reduce or eliminate the interference that WTRUs from one sector can cause to WTRUs in another sector. Every time the AP visits a sector and before the AP moves on to the next sector, the AP preferably sets the NAV equal to the time it will take until its next visit. The WTRUs in that sector will not transmit during the NAV period, and will not interfere with active WTRUs in other sectors.

For example, in a typical case, "beam sweeping" can be configured so that each sector is visited successively for a predefined period, with a period between the start of one visit and the next equal to the beacon period (BP), i.e. the maximum time allowed between the broadcast of successive beacon signals. For an area with N sectors, the AP services each sector for a period of time equal to BP/N in length. For example, if BP =600 ms and N =6, the AP services in each sector with a directional beam for 100 ms each visit. Every time the AP visits a sector, it typically will initially transmit a beacon signal. During the time the AP is covering a sector, WTRUs disposed in that sector are served at very high data rates. Note that BP =600 ms is just used for the sake of illustration, and any value could be used.

Every time the AP visits a sector, before the AP moves on to the next sector it can set and transmit a NAV equal to (N−1)*BP/N to all WTRUs in the sector, during which time the WTRUs in that sector assume that the medium is busy. After that time the AP will return to that sector (i.e., it will point a beam to that sector) and the WTRUs in that sector are again able to contend for the medium.

Instead of, or in addition to, using a NAV technique for avoiding signal collisions on the wireless medium, the present invention provides an alternative approach which is designed to improve collision prevention, particularly in the switched beam antenna context. The invention introduces "beam access control" (BAC) whereby an "on/off" bit, hereinafter referred to as a BAC bit, is broadcast by a base station, such as AP 25, to every sector. The WTRUs 27, 29 that communicate in the network are configured to receive and process the BAC bit in conjunction with the control of their respective transmissions as set forth below. All such WTRUs that receive the BAC bit set to "on" are allowed to transmit. All WTRUs that receive the BAC set to "off" must defer transmission until they receive another BAC with the bit set to "on". By utilizing this BAC technique in a WLAN, such as an IEEE 802 compliant WLAN, flexibility is improved while beacon periodicity is respected.

Preferably, an "on" BAC bit is broadcast by the AP 25 every time a beam is first directed to a sector and an "off" BAC bit is broadcast by the AP 25 every time the beam is about to be switched to another sector. The BAC bit can be sent in any other appropriate way, such as, for example, in a beacon frame, in a separate signaling packet designated as reserved for the BAC bit, or attached to the header of data packets. This relatively simple procedure allows a WTRU to be served by any beam that serves a sector in which the WTRU is located. Accordingly, when a WTRU, such as WTRU 29, is located in an overlap area covered by different sectors, that WTRU would receive the BAC bit from beams directed to each of the sectors that encompass the overlap region.

In this manner, the AP 25 can visit a sector, "turn on", i.e. allow transmissions from, all the WTRUs in that sector, send and receive data in that sector, then "turn off", i.e. block transmissions from, all WTRUs in that sector and move on to the next sector. Stations in areas in which beams overlap may transmit whenever they receive an "on" BAC, regardless of the beam in which it was sent.

Utilization of the BAC technique permits an AP to use load-based or other algorithms to dynamically select the beam switching pattern best suited to the location and service requirements of the WTRUs in its service area. Utilization of the BAC technique also facilitates combination of the beam switching pattern with an algorithm in the AP for queuing and scheduling of data packet transmissions. As WTRUs relocate to different sectors or change their service demands, such algorithms enable the AP to change the switching pattern to meet new conditions.

Where the WLAN requires APs to transmit beacon signals at a defined predetermined interval, i.e. beacon period (BP), it is necessary for an AP to provide service, i.e. direct a beam, to every sector at least once every BP. Conventionally, an AP will direct a beam to each successive sector for a period of time, a service period (SP), equal to the beacon period divided by the number N of sectors, i.e. SP=BP/N. Utilization of the BAC technique, permits an AP to use shorter service periods and reallocate service periods from a fixed sequence. For example, if there is no traffic in a given sector, after the AP 25 sends the beacon and waits for some period of time in order to allow for new WTRUs to associate with the AP, it can then send a BAC "off" to that sector and move on to serve another sector until it is time to send another beacon to the first sector.

Typically a minimum SP for transmitting a beacon signal, $SP_{bpmin}$, can be defined that is less than BP/N and provides sufficient time to allow for new WTRUs, if any, to associate with the AP. Accordingly, to regularly transmit beacon signals in all sectors within a period BP, for an AP serving N sectors, a beacon signal can be sent in a first sector during a $SP_{bpmin}$ starting at time $T_0$ and in each ith sector during a $SP_{bpmin}$ starting at time $T_0+[(BP/N)*(i-1) \bmod N]$. The time between, for example, the end of the service period providing a beacon signal to the first sector, $T_0+SP_{bpmin}$, and the time before the beginning of the service period providing a beacon signal to the second sector, $T_0+(BP/N)$, can be delegated for serving any other sector. These interim periods can be divided into multiple SPs of various duration to serve any of the sectors as determined by an appropriate scheduling algorithm implemented in the AP.

For convenience, a fixed length service period, $SP_{fx}$, can be used that is at least as long as the minimum SP for transmitting a beacon signal, $SP_{fx} \geq SP_{bpmin}$, and equally divides the periods between the start of each required successive beacon transmission, i.e. $SP_{fx}=(BP/N)/J$ where J is an integer greater than 1. For the AP 25 of FIG. 2 that serves six sectors, an $SP_{fx}$ could be set equal to BP/12 so that there are 12 SPs during each BP. Accordingly, within any given sequence of 12 SPs, SP1 through SP12, each odd SP can be allocated for providing the required beacon signal in the six sectors, respectively, and the even SPs can be allocated based on comparative communication needs among the six sectors. Alternatively, the first six SPs, SP1 through SP6, can be used for providing the required beacon signal in the six sectors, respectively, and the last six SPs, SP7 through SP12, can be allocated based on comparative communication needs among the six sectors. In the latter case multiple consecutive SPs can be allocated to any of the sectors which can be advantageous to reduce signaling.

As an alternative example, for serving N sectors, for any given period BP, beacons can be sent to the N respective sectors in N successive minimum periods, $SP_{bpmin}$, so that there is a time equal to $BP-(N * SP_{bpmin})$ available for dynamic service allocation among the sectors. In such case, if $SP_{bpmin}$ is relatively very small, a BAC can be sent in the beacon signals to control the WTRUs for the post-beacon dynamically allocated service period of a BP, $SP_{postbeacon}$, during which the AP serves one or more sectors based on a load algorithm.

Figure 3:
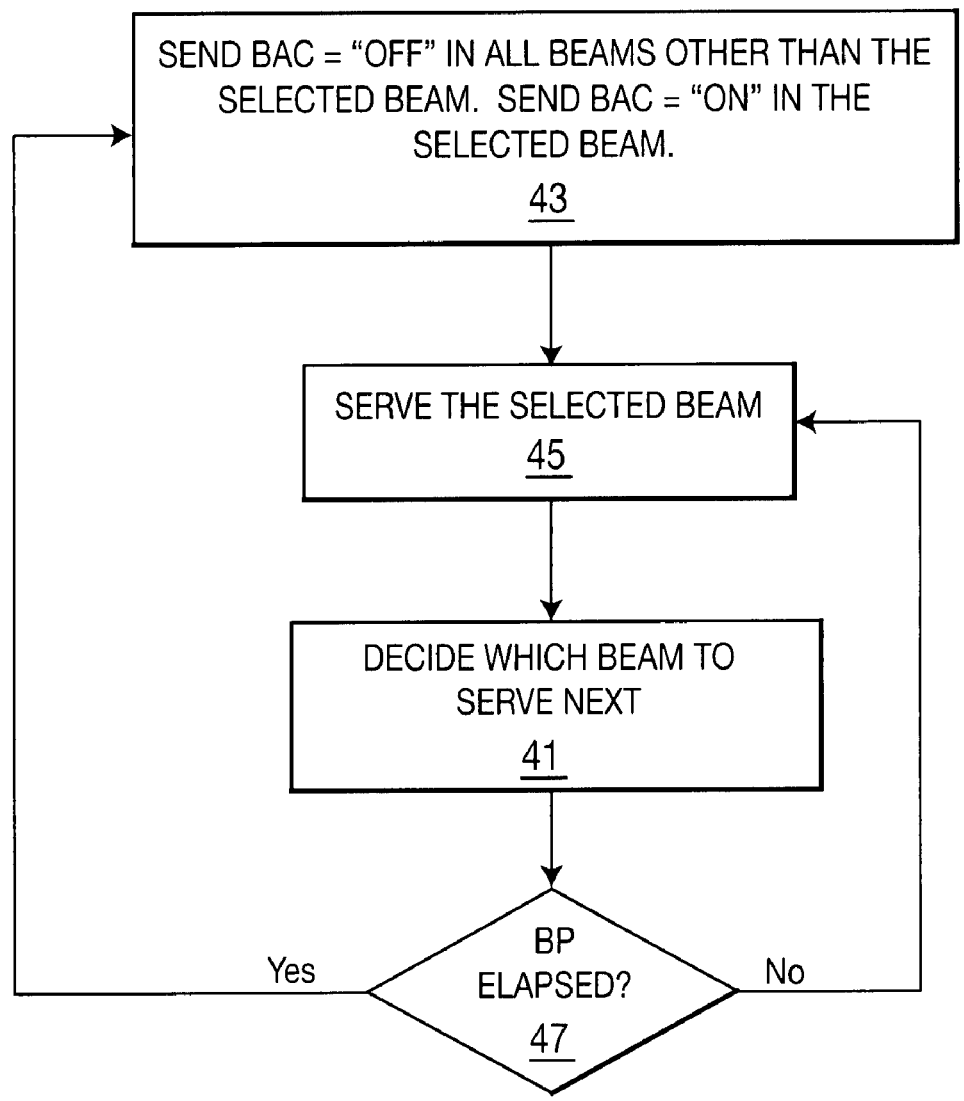
FIG. 3 is a flow diagram of a process for providing wireless service using a switched beam in accordance with the present invention.

One manner of operation in this regard is set forth in FIG. 3. As represented by step 41, the AP can make its decision for a next BP which sector to service for the $SP_{postbeacon}$ which may be divided into multiple SPs serving different sectors. Then, at the start of that next BP, at a time $T_0$, the AP transmits a beacon to every sector from $T_0$ through $T_0+(N*SP_{bpmin})$. Accordingly, the beacon signal transmissions start at time $T_0$ in a first sector and in a selected order thereafter to the other sectors. Where such beacon signal transmissions are made, the AP preferably sends a BAC set to "off" in the beacons to all sectors except the sector previously selected to be initially served in the post beacon period SPs for that BP for which a beacon with the BAC set to "on" is sent as represented in step 43. Thereafter, as reflected in step 45, the AP serves the sector selected in step 41.

Where the $SP_{postbeacon}$ is a single SP, the AP serves the same sector until the BP elapses and also decides which sector to serve during the next BP. Where the $SP_{postbeacon}$ is divided into multiple SPs, at the end of each such sub SP of the $SP_{postbeacon}$, the AP sends a BAC set to "off" and starts in conjunction with making a decision which sector to serve next, step 41. Where the BP has not elapsed, as reflected in step 47, a beam is directed to the next sector to be served and initially transmits a BAC set to "on" to that sector. Optionally, during a BP, all sectors to be served in the $SP_{postbeacon}$ of the next BP can be identified. Where a fixed SP is used, the AP can readily be configured to make such decisions in connection with conventional scheduling of transmission and receipt of data packets.

If a WTRU is able to receive more than one beacon, such as WTRU 29 which is located in an area where beams overlap, the WTRU can contend for the medium whenever it receives an "on" BAC from a beam serving either sector. In the immediately preceding example where the BAC bit is sent in successive $SP_{bpmin}$s, the "on" BAC can be sent as a 1 value and "off" BAC is sent as a 0 value. Then the WTRUs can be configured to sum all BAC values received during any given period of time that is $(N*SP_{bpmin})$ in length and to treat the sum as the BAC value. In this case, a WTRU, such as WTRU 29, can receive an "off" BAC from one beam and an "on" BAC from another beam and remain on for one of two overlapping sectors in which the WTRU is located.

Where there is a need to have a logical separation between sectors, each sector can have its own sector or beam identity. The beam identity can be sent together with the BAC. This enables WTRUs to take advantage of such information. For example, a WTRU can decide which command to respect ("on" or "off") based on the selected sector in lieu of, for example, summing values or otherwise determining BAC validity where the WTRU is disposed in an overlapping service area. Optionally, every WTRU may be assigned a beam during association.

WTRUs need not be configured to process every beacon signal sent. WTRUs can, for example, be configured to process only every W-th beacon. The value of W is preferably determined by the AP as part of a scheduling mechanism. The AP is preferably configured to set the value of W independently for each sector, and can be configured to dynamically adjust that value. The value of W can be transmitted together with the BAC and/or the beam identity when a beam identity is used. Preferably, the AP determines W as a function of the number of sectors (N), the load of the system, the number of WTRUs in each beam, the fading environment, and/or other variable conditions.

For example, in a case where there are only two sectors in the AP coverage area, a first beam and a second beam can be generated to provide the wireless service. If there is a required BP=100 ms, the AP is required to send a beacon every 100 ms to each of the two sectors. If most WTRUs being served are disposed in the second sector and the first sector is very lightly loaded a decision can be made to primarily serve the second sector. Then, starting at a time $T_0$ of a BP, the AP sends a beacon in the first sector setting all WTRUs in the first sector to "off" and a beacon in the second sector setting all WTRUs in the second sector to "on", and then serves the users in the second sector for the remaining portion of the 100 ms BP.

In lieu of repeating this process for three successive BPs in order to provide greater service to the second sector, the AP can send the beacon on the first beam in conjunction with a W value, for example, W=3, notifying the WTRUs in the first sector to be inactive for three BPs, i.e. the next W*BP=300 ms. The AP then services the second sector for those three BPs. This can create a variable beacon period for each sector that allows for WTRUs in each sector to go into a sleep mode for an adjustable period of time. Optionally, during the period in which the WTRUs in one sector are in such a sleep mode, the AP can continue to send the regular periodic beacon in all sectors to allow new WTRUs to join any of the sectors served by the AP.

In an IEEE 802.11 compliant system, every WTRU typically performs authentication and association before starting communication with an AP of the 802.11 WLAN. This is a time-consuming process. Supporting highly mobile users in a sectored system can be a problem if authentication and association are required every time a WTRU moves to a different sector, since the coverage area is small and the antenna beam covers a sector for a short period of time. Utilization of the BAC technique facilitates support for higher levels of mobility and fast handoffs between sectors without the need of authentication or association by making all sectors part of the same BSS (i.e., have the same BSSID).

Where there is a need to have a logical separation between sectors, each AP beam or group of beams can be associated with a different AP identity, as though each sector or group of sectors was being served by a different AP. In this case, the WTRUs can be pre-authenticated during the scanning process, allowing for faster transitions/handoffs. This can be implemented by assigning a different BSSID for each sector. However, a WTRU in an overlapping area would not be able to communicate with the AP in both unless it was configured to use two BSSIDs; normally a WTRU configured for an 802.11 WLAN is able to associate with only a single BSS. Thus, as an enhancement for a WLAN where APs use different BSSIDs for different sectors, WTRUs can be configured to be able to associate with more than one BSS for contemporaneous communication with a single AP via more than one sector in order to allow a WTRU to be served by multiple beams and also minimizing the mobility impact.

In many WLANs, APs are required to be configured to transmit broadcast and multicast messages to all WTRUs in their respective coverage areas, which for APs using a switched antenna system means all sectors. In order to support such functionality, an AP is typically configured to buffer all data packets associated with broadcast/multicast messages, until the AP transmits all packets. This can cause aging issues, since new broadcast messages arrive before the old messages are transmitted. By transmitting the broadcast messages in all sectors before discarding them, the probabilility that every station receives the message increases, since the stations are able to receive packets coming from multiple sectors. This creates redundancy in the transmission.

In a system with N sectors, the AP serves each sector for some percentage of the total service time which can be designated as a "service ratio". Where there is an even distribution of traffic in each sector, the AP's antenna preferably serves each sector, on average, during 1/N of the time so that the "service ratio" for all sectors is 1/N in such conditions. In order to maximize efficiency, or maximize the "service ratio", the AP may employ multiple antennas that are co-located where each antenna is configured to serve a different set of sectors. For example, if there are two antennas, each contemporaneously serving half of N total sectors, N/2 sectors, the preferred "service ratio" for evenly distributed traffic load would be 2/N. This distribution assumes that the two antennas do not interfere with each other. Utilization of the BAC technique facilitates the use of co-located, multiple antennas since the BAC technique enables the service ratio of any of the sectors served by any of the antennas to be adjusted based on load criteria. In such context, the BAC transmitted by each antenna is preferably independently determined based on the service load requirements and conditions in the sectors served by the respective antennas.

Although the features and elements of the present invention are described in the preferred embodiments in particular combinations, each feature or element can be used alone without the other features and elements of the preferred embodiments or in various combinations with or without other features and elements of the present invention. Moreover, the beam access control can be combined with other algorithms, such as the packet scheduling algorithm, increasing the fairness of the system. For example, for users that can be served by multiple beams, the AP can control the total number of packets transmitted to that user (so that user is not unfairly receiving too much bandwidth). QoS parameters can also be used to make decisions on beam access control. For example, if certain sectors have users with strict delay requirements (such as users running Voice over IP applications), then these sectors can be visited more often in order to guarantee the QoS requirements of the VoIP application.

Preferably, decision logic circuitry for determining BAC bit values and formatting communication data frames including BAC data for transmission to WTRUs are implemented on a single integrated circuit for an AP, such as an application specific integrated circuit (ASIC), with the interface component and one or more of the components that implement the respective network communication protocol stacks. However, the components may also be readily implemented on multiple separate integrated circuits. Similarly, WTRU signal processing circuitry that processes received communication frames including BAC data in association with controlling the mode of the WTRU are preferably implemented on an ASIC.

The foregoing description makes references to specific AP and network configurations as an example only and not as a limitation. Other variations and modifications consistent with the invention will be recognized by those of ordinary skill in the art.

What is claimed is:

1. A wireless transmit/receive unit (WTRU) comprising:
a transceiver configured to receive a beacon signal and a beam access control (BAC) signal from an access point (AP) via at least one directional beam in a sector in which the WTRU is located during a beacon service period configured for reception of the beacon signal in the sector, the BAC signal indicating allowance or disallowance of transmission of a signal from the WTRU in the sector during a post-beacon period, the beacon signal being periodically received at least once in a beacon period and the beacon period comprising a plurality of beacon service periods for all sectors and the post-beacon period remaining after the beacon service periods for all sectors; and
a controller configured to control transmission of a signal by the transceiver during the post-beacon period based on the BAC signal.

2. The WTRU according to claim 1 wherein the controller is configured to sum all of received BAC signals during the beacon service period to determine a BAC value when controlling the transmission of the signal.

3. The WTRU according to claim 1 wherein a beam identity is received with the BAC signal.

4. The WTRU according to claim 3 wherein the beam identity permits the controller to determine the validity of the BAC signal.

5. The WTRU according to claim 1, wherein
the transceiver is configured to receive at least one Network Allocation Vector (NAV) signal from the AP, and
the controller is configured to control the transmission of the signal based on the at least one NAV signal received by the transceiver.

6. The WTRU according to claim 5 wherein the received NAV signal prevents the transmission of the signal by the transceiver until expiration of a controlling NAV.

7. The WTRU according to claim 6 wherein the controlling NAV is set by the AP before the AP directs its beam to a different sector and is equal to the time it takes for the AP to direct its beams back to the sector in which the WTRU is located.

* * * * *